United States Patent
Mizuta

[11] Patent Number: 5,910,062
[45] Date of Patent: Jun. 8, 1999

[54] LUBRICATING STRUCTURE OF AUTOMATIC TRANSMISSION

[75] Inventor: Muneo Mizuta, Fuji, Japan

[73] Assignee: Jatco Corporation, Fuji, Japan

[21] Appl. No.: 08/899,148

[22] Filed: Jul. 23, 1997

[30] Foreign Application Priority Data

Jul. 23, 1996  [JP]  Japan .................................. 8-193212

[51] Int. Cl.$^6$ ................................................ F16H 57/04
[52] U.S. Cl. ..................... 475/159; 184/6.12; 184/11.1
[58] Field of Search ............................. 475/159; 74/467;
184/6.12, 11.1, 11.3, 13.1

[56] References Cited

U.S. PATENT DOCUMENTS

| | | | |
|---|---|---|---|
| 2,408,336 | 9/1946 | Orr ...................................... | 475/159 X |
| 3,131,582 | 5/1964 | Kelbel ................................. | 475/159 X |
| 5,314,616 | 5/1994 | Smith .................................. | 475/159 X |
| 5,456,476 | 10/1995 | Premiski et al. ..................... | 475/159 X |
| 5,597,370 | 1/1997 | Nogle .................................. | 475/159 |

FOREIGN PATENT DOCUMENTS 5-61497   9/1993   Japan .

*Primary Examiner*—Richard M. Lorence
*Assistant Examiner*—Sherry Lynn Estremsky
*Attorney, Agent, or Firm*—Jacobson, Price, Holman & Stern, PLLC

[57] ABSTRACT

A lubricating structure of an automatic transmission is provided which is capable of realizing high lubrication efficiency by allowing lubricating oil to flow efficiently, and of retaining the durability of a member to be lubricated. In the lubricating structure of the automatic transmission, an oil seal line (35) corresponds to a line on which an oil catching member (29) comes into contact with a carrier plate (10), and the oil seal line (35) has a configuration in which the distance in radial directions from an input shaft (21) to each point on the oil seal line (35) is made unequal so that the lubricating oil caught by the oil catching member (29) flows along the oil seal line (35) toward the opening of an oil path (28) on the side opposite to the side on which a pinion is disposed by centrifugal force making rotation on the input shaft (21).

5 Claims, 12 Drawing Sheets

LUBRICATING STRUCTURE OF AUTOMATIC TRANSMISSION

BACKGROUND OF THE INVENTION

1. Field of the Invention

This invention relates to a lubricating structure of an automatic transmission principally used for controlling the transmission of driving force in a vehicle.

2. Description of the Prior Art

There has been known a conventional lubricating structure of an automatic transmission, such as that disclosed in Japanese Patent Application Laid-Open Publication No. Hei 5-61497.

Figure 9:
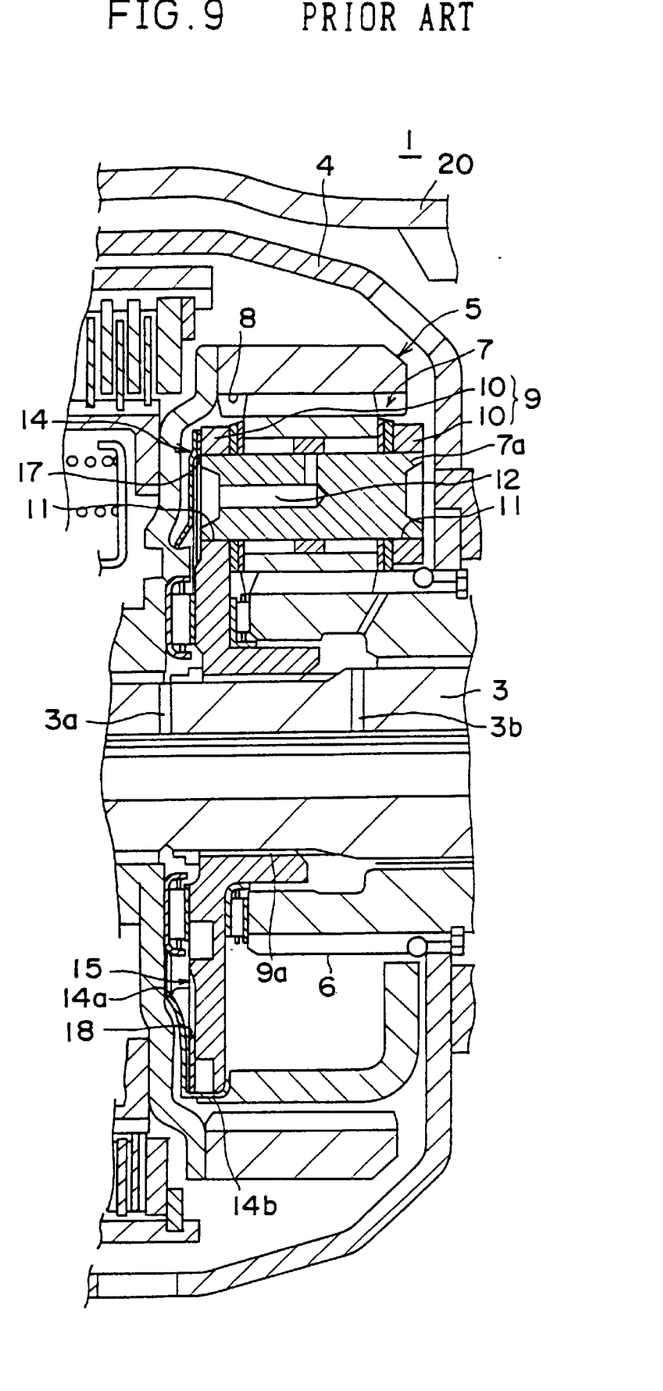
FIG. 9 is a partially sectional view of an essential part of a lubricating structure of a conventional automatic transmission.
Figure 10:
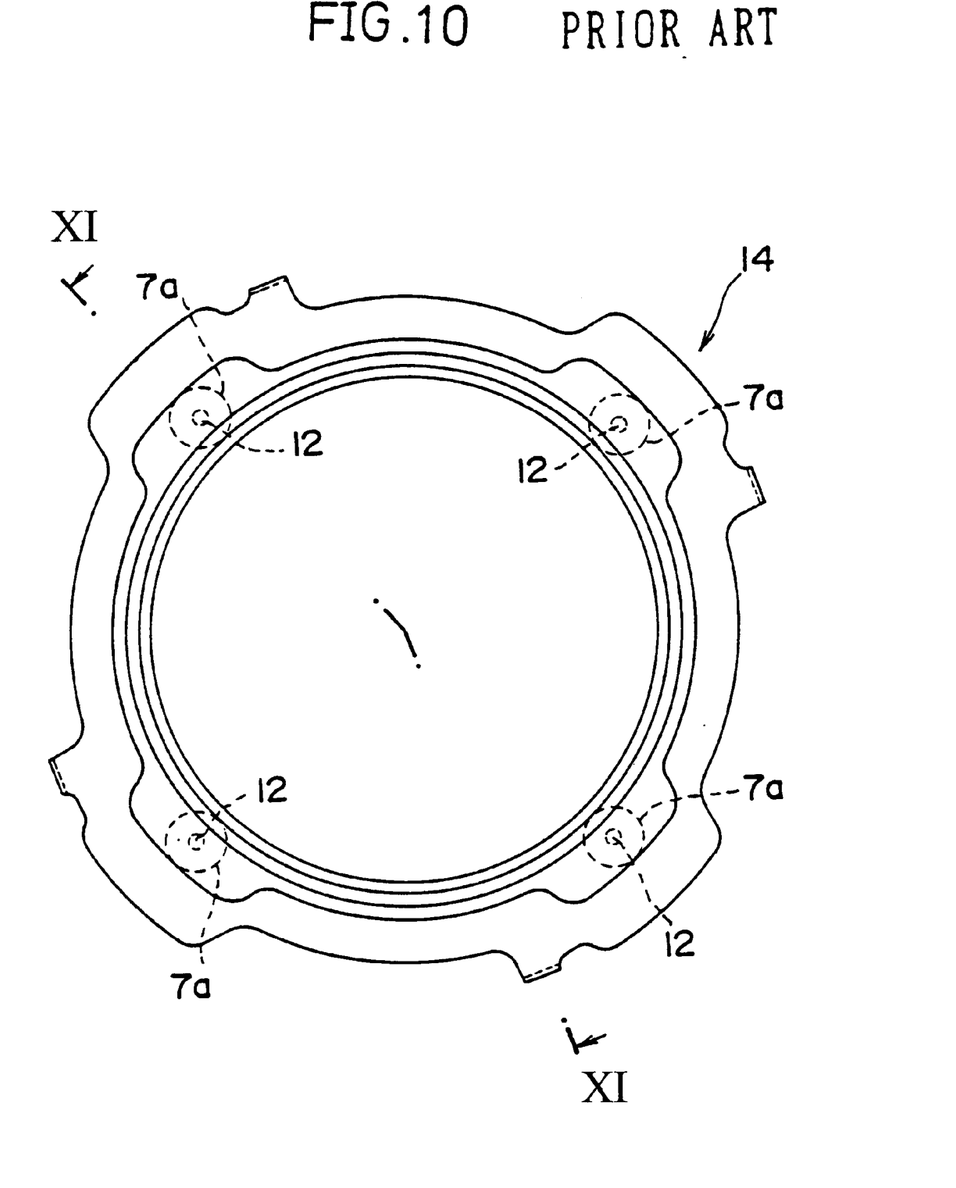
FIG. 10 is a plan view of an oil catching member in the lubricating structure of the conventional automatic transmission, seen from a side where a carrier plate is disposed.
Figure 11:
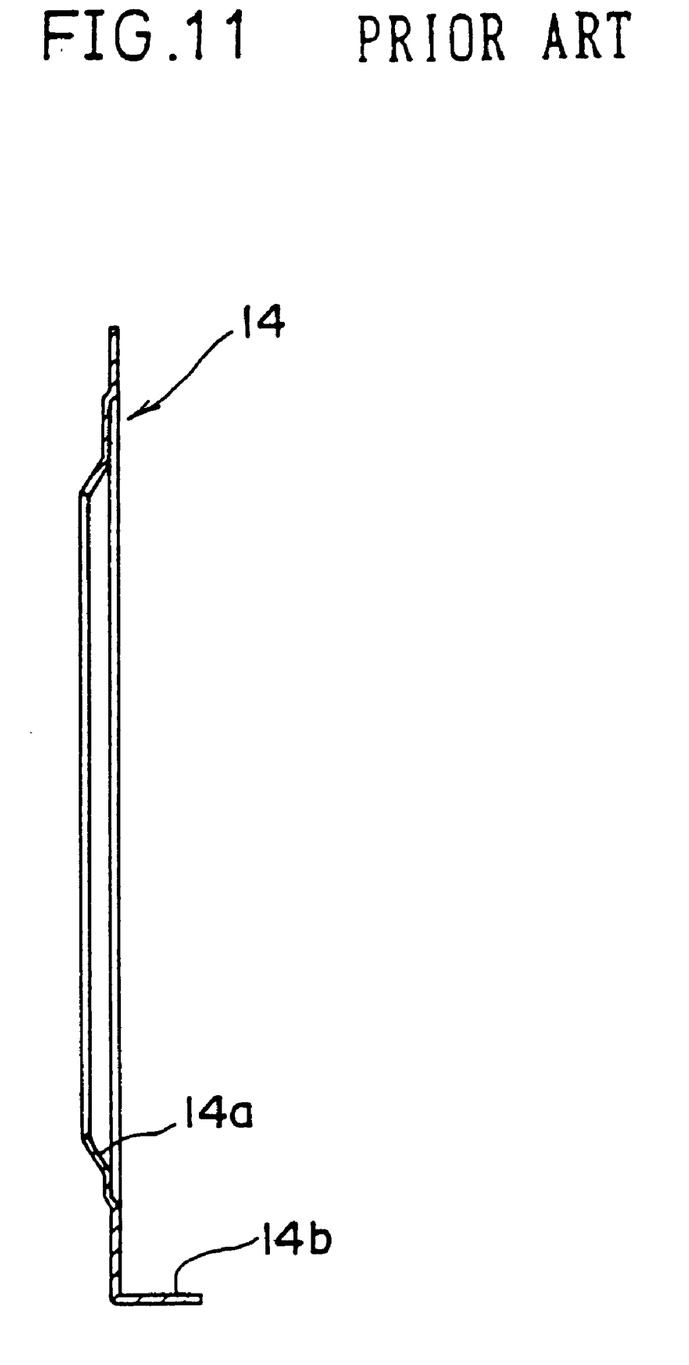
FIG. 11 is a sectional view of the oil catching member in the lubricating structure of the conventional automatic transmission, taken on line XI—XI in FIG. 10.

As shown in FIGS. 9 to 10, a planetary gear device 5 is disposed around an output shaft 3 used as a rotational axis in such an automatic transmission 1.

An oil catching member 14 is disposed on a side of a carrier plate 12 of the planetary gear device 5, and the side is opposite to the side on which a pinion 7 is disposed.

The oil catching member 14 consists mainly of a guide portion 14a used as an oil receiver and an attachment portion 14b extending from the guide portion 14a. As shown in FIG. 9, the attachment portion 14b is caulked by the carrier plate 10, and thereby the oil catching member 14 is disposed circularly around the output shaft 3.

Figure 12:
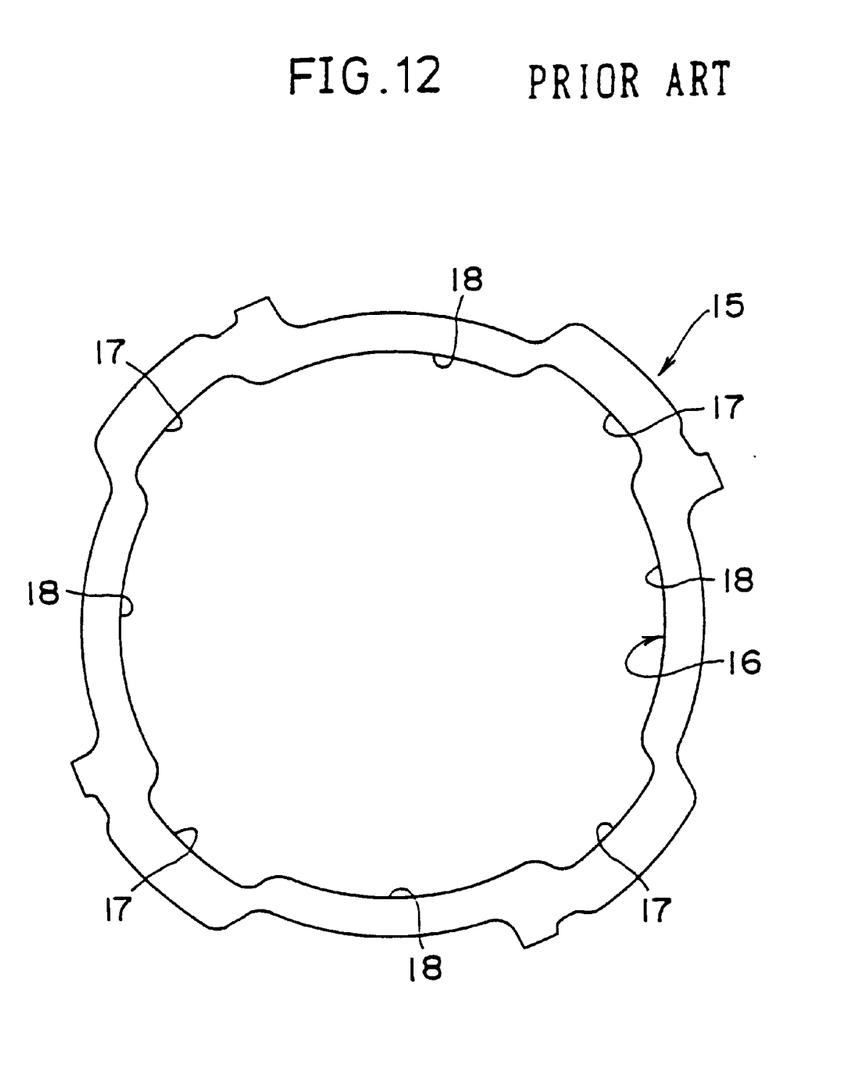
FIG. 12 is a plan view of a seal member in the lubricating structure of the conventional automatic transmission.

A platelike seal member 15 shown in FIG. 12 is disposed between the oil catching member 14 and the side 10a opposite to the side on which the pinion 7 of the carrier plate 10 is disposed. The inner circumferential line of the seal member 15 is constructed as an oil seal line 16 with which a leakage of lubricating oil from between both the members 10, 14 toward the outside in the radial direction is blocked.

As shown in FIG. 12, the oil seal line 16 includes enlarged diameter portions 17 each of which has a large distance in a diametrical direction, and shortened diameter portions 18 each of which has a smaller distance in a diametrical direction than the enlarged diameter portion 17. The enlarged diameter portion 17 corresponds to a position where each of pinion shafts 7a is disposed, as shown in a broken line of FIG. 10, and the shortened diameter portion 18 is formed between the enlarged diameter portions 17, 17.

The oil catching member 14 catches the lubricating oil emitted from an oil hole 3a formed in the output shaft 3 on the shortened diameter portion 18, then leads the lubricating oil to an oil path 12 formed in the pinion shaft 7a, then sends the lubricating oil led to the oil path 12 to the side of the pinion 7, and lubricates the tooth surface of the pinion 7, a bearing, and the like.

However, according to this conventional automatic transmission lubricating structure, the shortened diameter portion 18 of the oil seal line 16 is formed so that all points of the oil seal line 16 are positioned at equal distances from the rotational center of the output shaft 3, and therefore, unless the lubricating oil which has been caught overflows the oil catching member 14 by exceeding an allowable predetermined quantity, or unless acceleration in a circumferential direction generated by varied revolution speed of the oil catching member 14 is given to the lubricating oil, the lubricating oil does not flow toward the enlarged diameter portion 17.

Further, in the conventional structure, since a carrier 9 is connected to the output shaft 3, the carrier plate 10 continues to rotate and thus the oil catching member 14 also continues to rotate while a vehicle is traveling. However, when the oil catching member 14 is applied to the carrier plate 10 of the planet carrier 9, the carrier plate 10 stops rotating depending on the transmission gear, and thereby the oil catching member 14 may stop rotating. In this case, since the acceleration in a circumferential direction is lost, disadvantageously, the flow of the lubricating oil toward the enlarged diameter portion 17 may not occur.

Therefore, in order always to supply a sufficient quantity of lubricating oil to the pinion 7, after all, a larger quantity of lubricating oil than necessary is required to be emitted from the output shaft 3. As a result, a large quantity of lubricating oil is required, so that high lubrication efficiency did not seem to be obtained.

In the enlarged diameter portion 17, the lubricating oil which has been caught directly by the enlarged diameter portion 17 and the lubricating oil which has flowed from and has been collected into the adjacent right and left shortened diameter portions 18, 18 are transmitted to the side of the pinion 7 through the oil path 12. At this time, the total quantity of the collected lubricating oil flows through the narrow oil path 12, and thereby, disadvantageously, the flow of the lubricating oil is blocked with unnecessary substances, such as initially-worn powder and the like. As a result, the durability of a member to be lubricated, such as a bearing member or the like, might be lowered.

SUMMARY OF THE INVENTION

An object of the present invention is to provide a lubricating structure of an automatic transmission which is capable of realizing high lubrication efficiency by allowing lubricating oil to flow efficiently, and of retaining the durability of a member to be lubricated.

The lubricating structure of the automatic transmission according to an aspect of the present invention is characterized in that it comprises a sun gear disposed along a rotational-center axis, a plurality of pinions which are disposed around the sun gear and are engaged therewith, a pinion shaft holding the pinion so as to make it rotatable, a carrier which includes a carrier plate holding each end of the pinion shaft, an oil path which is formed along the direction in which the axis of the pinion shaft extends in the carrier plate or the pinion shaft and which connects both sides of the carrier plate, and an oil catching member which is disposed circularly around the rotational-center axis on a side opposite to the side on which the pinion is disposed in the carrier plate and which catches lubricating oil supplied from the rotational-center axis and leads the lubricating oil to the oil path, wherein an oil seal line corresponds to a line on which the oil catching member comes into contact with the carrier plate, and the oil seal line has a configuration where the distance in radial directions from the rotational-center axis to each point on the oil seal line is made unequal so that the lubricating oil caught by the oil catching member flows toward an opening of the oil path on the side opposite to the side on which the pinion is disposed by centrifugal force making a rotation on the rotational-center axis.

According to this construction, since the distance in radial directions from the rotational-center axis to each point on the oil seal line is unequal, the centrifugal force making a rotation on the rotational-center axis generates a component force in the direction where each of the adjacent pinion shafts is disposed. This component force carries the lubricating oil caught by the oil catching member in the direction where each of the pinion shafts is disposed.

The lubricating oil flows along the oil seal line toward the opening of the oil path on the side opposite to the side on which the pinion is disposed, then passes through the oil path, and flows from an opening on the side where the pinion is disposed.

Further, the oil seal line is formed along the circumscribed line between the adjacent pinion shafts.

Therefore, since the distance in radial directions from the rotational-center axis to each point on the oil seal line is unequal, the component force of the centrifugal force making a rotation on the rotational-center axis works along the oil seal line, i.e., at any point on the oil seal line.

Further, the lubricating structure of the automatic transmission is characterized in that the oil seal line includes a part projecting toward the side of the rotational-center axis from the circumscribed line between the adjacent pinion shafts.

According to this construction, the oil seal line includes a part projecting toward the side of the rotational-center axis from the circumscribed line between the adjacent pinion shafts, so that the component force can be made larger.

For example, in a case where the projecting part toward the side of the rotational-center axis is formed close to either side of the pinion shafts, the centrifugal force can generate a component force directed to the other pinion shaft substantially over the whole oil seal line.

Therefore, in a case where the relative rotational direction of the rotational-center axis and the carrier is kept substantially in a certain direction in each transmission gear, the lubricating oil can flow more smoothly to the other pinion shaft.

Further, the lubricating structure of the automatic transmission is characterized in that the oil seal line is formed rectilinearly between the adjacent pinion shafts, and it is formed so that each distance between the foot of a perpendicular on the oil seal line divided by a perpendicular line extending from the rotational-center axis and each pinion shaft becomes unequal.

According to this construction, the oil seal line is formed rectilinearly between the adjacent pinion shafts, and in addition, it is formed so that each distance between the foot of the perpendicular on the straight oil seal line divided by the perpendicular line extending from the rotational-center axis and each pinion shaft becomes unequal. Therefore, the component force generated on the oil seal line between the foot of the perpendicular and each pinion shaft is directed to each pinion shaft.

Therefore, the quantity of the lubricating oil flowing toward each pinion shaft can be regulated by being substantially proportioned to each distance from the pinion shaft to the foot of the perpendicular.

Further, the lubricating structure of the automatic transmission is characterized in that the oil seal line includes an unnecessary-substance puddle which is swelled outside of the pinion shaft and holds unnecessary substances, so that the unnecessary substances do not flow out along the oil seal line even under the centrifugal force making a rotation on the rotational-center axis.

According to this construction, the unnecessary-substance puddle holds the unnecessary substances so that the unnecessary substances do not flow out along the oil seal line even under the centrifugal force making a rotation on the rotational-center axis.

Therefore, the flow of the lubricating oil can be prevented from being blocked with the unnecessary substances, such as initially-worn powder, and the durability of a member to be lubricated, such as a bearing member, can be prevented from being lowered.

DETAILED DESCRIPTION OF THE PREFERRED EMBODIMENTS

A first embodiment of the present invention will be hereinafter described with reference to the accompanying drawings. In this embodiment, the same numerals are each given to the same constituent parts as those of the conventional automatic transmission lubricating structure.

Figure 1:
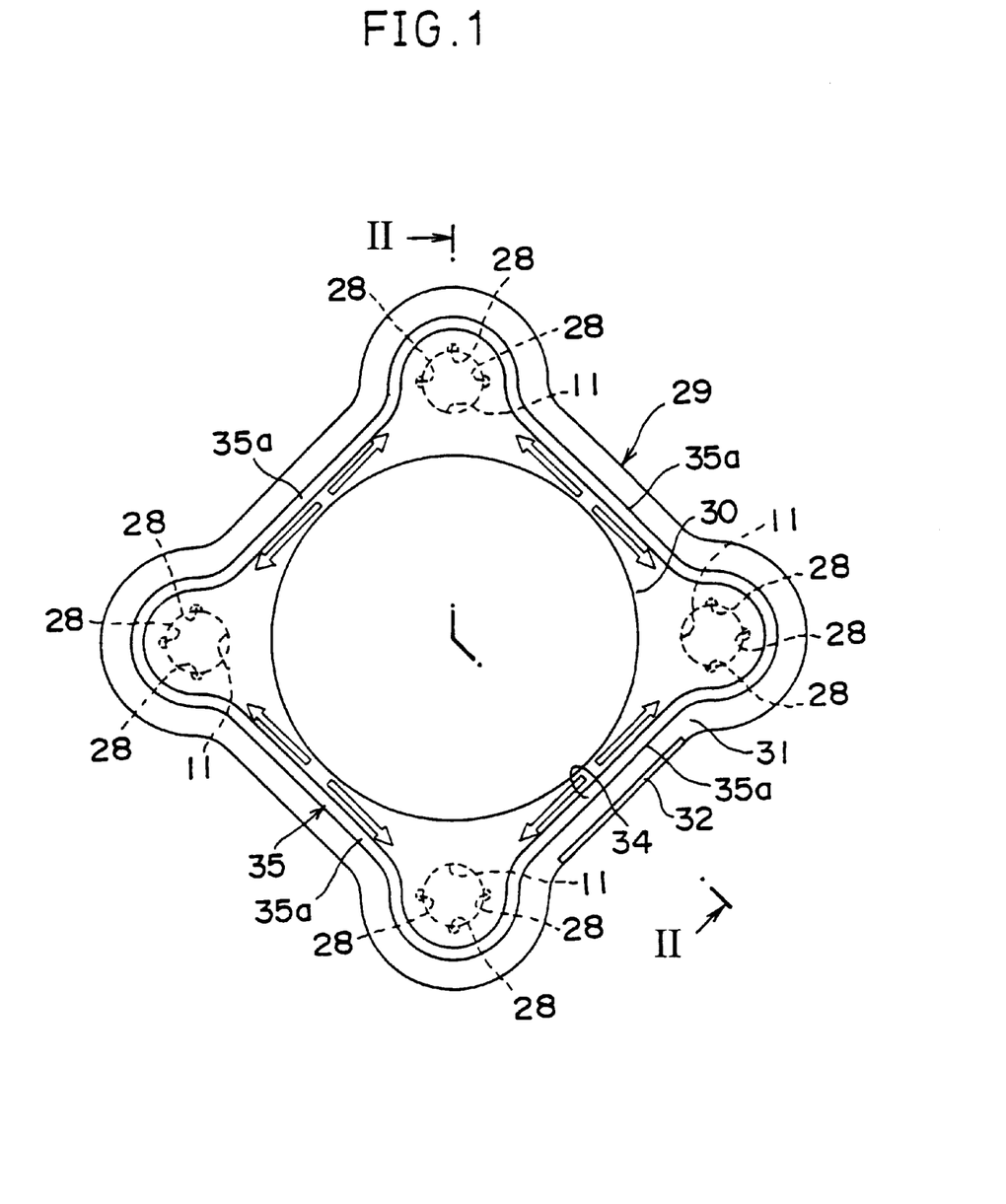
FIG. 1 is a plan view of an oil catching member in a lubricating structure of an automatic transmission according to a first embodiment of the present invention, seen from a side where a carrier plate is disposed.
Figure 2:
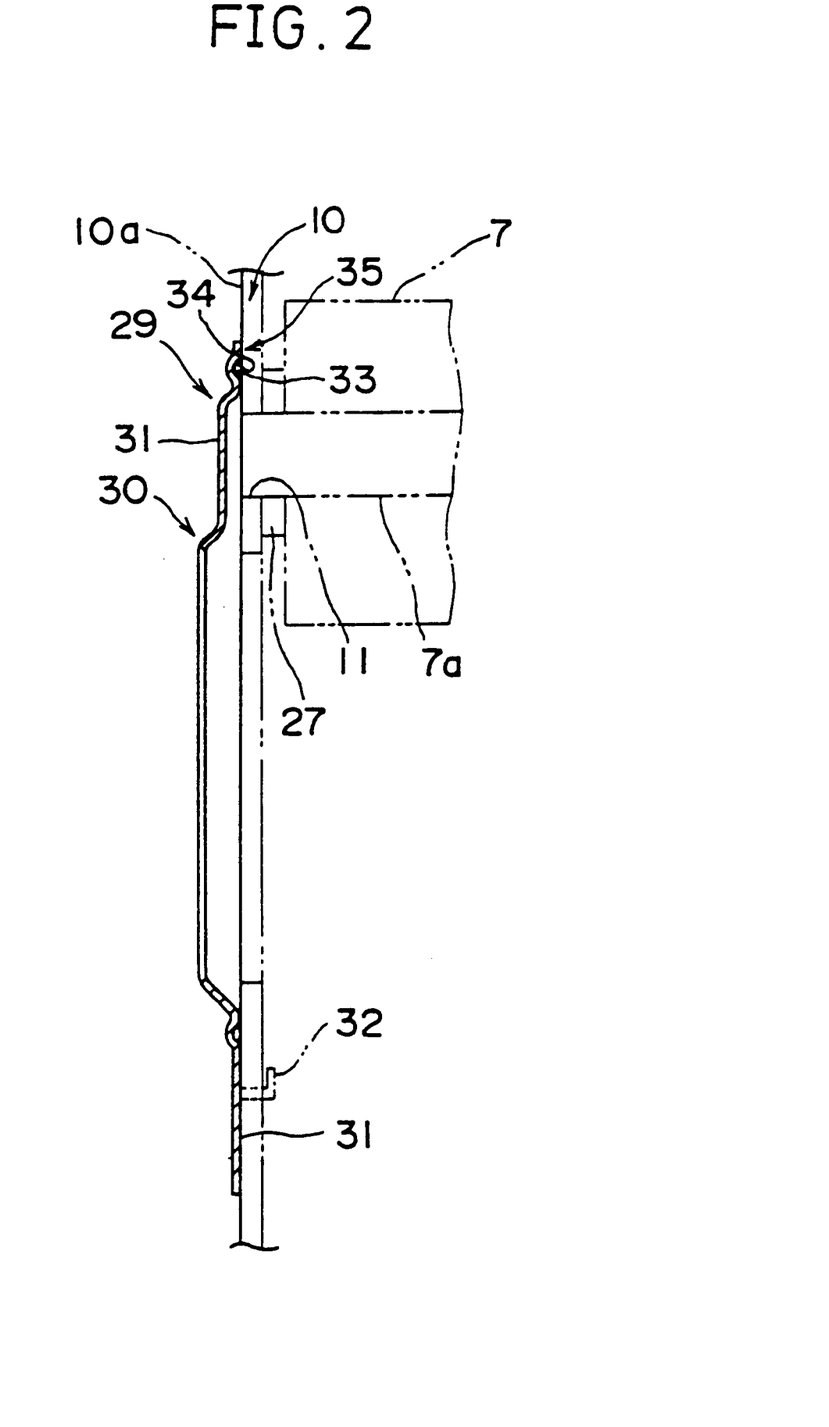
FIG. 2 is a sectional view of the oil catching member in the lubricating structure of the automatic transmission according to the first embodiment, taken on line II—II in FIG. 1.
Figure 3:
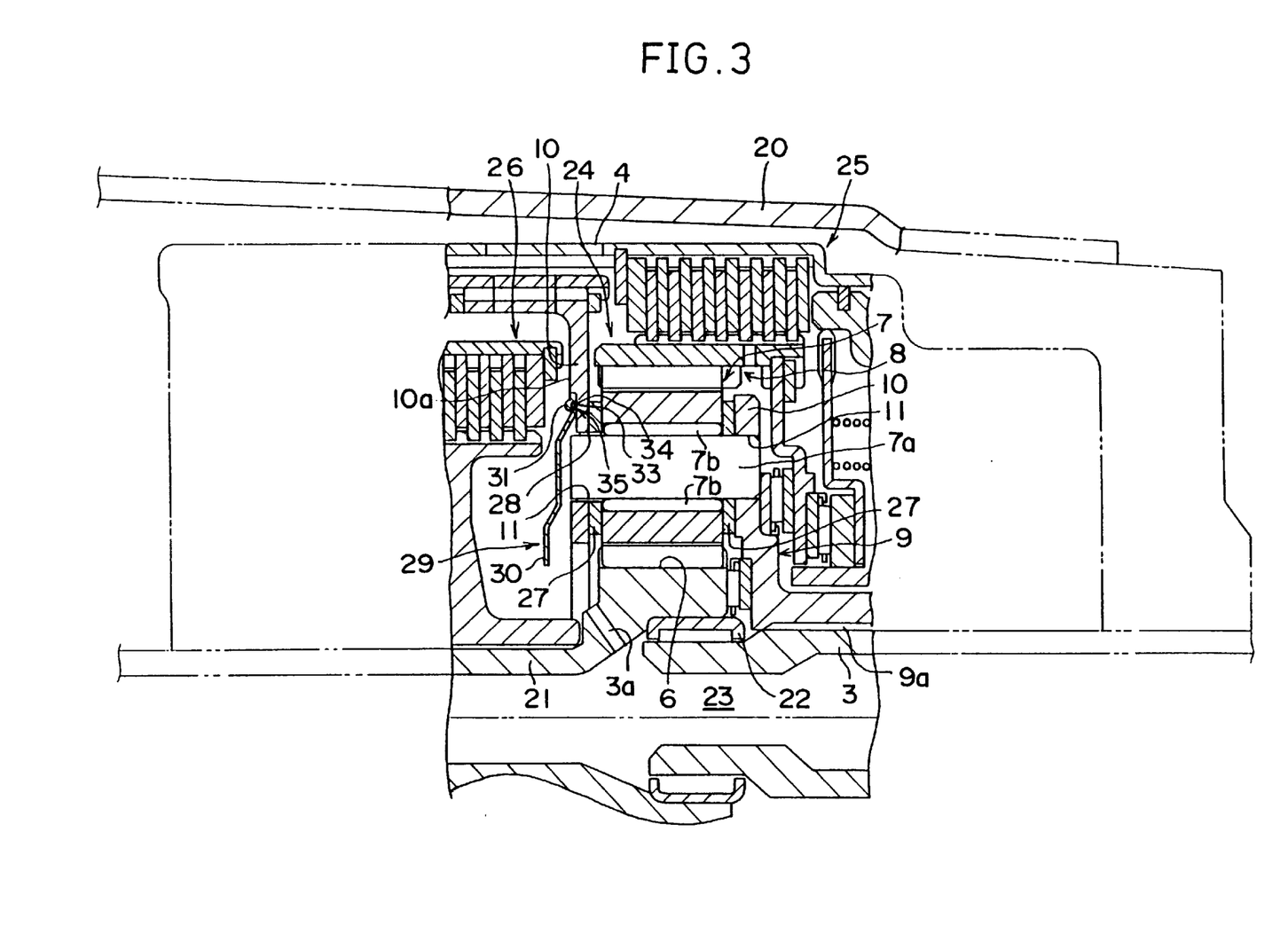
FIG. 3 is a partially sectional view of an essential part of the lubricating structure of the automatic transmission according to the first embodiment.

FIGS. 1 to 3 show a lubricating structure of an automatic transmission according to a first embodiment of the present invention, in which an input shaft 21 used as a rotational-center axis, and an output shaft 3 connected to the input shaft 21 via a radial bearing 22 are rotatably disposed substantially in the center of a case 20, as shown in FIG. 3.

The inside of each of the input shaft 21 and the output shaft 3 is hollowly formed to make a lubricating oil path 23.

An oil hole 3a through which lubricating oil is supplied to each transmission element disposed outside of the input shaft 21 is formed in an oblique radial and axial direction in the input shaft 21.

A planetary gear device 24 and a forward clutch device 25 are disposed around the output shaft 3 and inside of a connection drum 4.

On the left side of FIG. 3, a high clutch device 26 is disposed adjacent to the planetary gear device 24.

The planetary gear device 24 is provided with a sun gear 6 which is united with the input shaft 21 at the rear end thereof, a plurality of pinions 7 which are disposed around the sun gear 6 and are engaged with the sun gear 6, and an internal gear 8.

The pinions 7 are held rotatably on pinion shafts 7a via needle bearings 7b.

In detail, each end of the pinion shaft 7a is held rotatably by being inserted into each of thrust washers 27, 27 and then by being inserted into each of shaft holding holes 11, 11 of substantially platelike carrier plates 10, 10.

The carrier plates 10, 10 are formed to rotate together with a planet carrier 9, and the planet carrier 9 makes a spline connection at a spline portion 9a with the output shaft 3.

In the thrust washer 27 and the shaft holding hole 11 which are located on the left side of the pinion 7, as shown in FIG. 3, each of three oil paths 28 is formed along the direction in which the pinion-shaft axis extends.

The oil path 28 connects both sides of the carrier plate 10 on the left side in FIG. 3, and in addition, it also connects both sides of the thrust washer 27 corresponding to the carrier plate 10.

The oil path 28 is constructed so that lubricating oil is supplied to the tooth surface of the pinion 7 engaged with the sun gear 6 and the needle bearing 7b engaged with the internal gear 8.

An oil catching member 29 is disposed on a side 10a of the carrier plate 10, and the side 10a is opposite to the side on which the pinion 7 is disposed.

The oil catching member 29 is formed in compression molding, and it consists mainly of a guide portion 30 used as an oil receiver, a flanged portion 31 formed around the guide portion 30, and an attachment portion 32 extending from the flanged portion 31.

Herein, the attachment portion 32 is caulked by the carrier plate 10, and thereby, as shown in FIG. 3, the oil catching member 29 is disposed circularly around the input shaft 21.

An O-ring groove 34 into which is fitted an annular rubber O-ring 33 is formed in the flanged portion 31.

The O-ring 33 disposed along the O-ring groove 34 is laid between the oil catching member 29 and the side 10a of the carrier plate 10 which is opposite to the side on which the pinion 7 is disposed. The O-ring 33 comes into contact with the side 10a of the carrier plate 10 which is opposite to the side on which the pinion 7 is disposed, and a line to seal a part between both the members 10, 29 is constructed as an oil seal line 35 with which a leakage of lubricating oil from between both the members 10, 29 toward the outside in the radial direction is blocked.

The oil seal line 35 includes substantially rectilinear portions 35a . . . by which the distance in radial directions from the center of the input shaft 21 to each point on the oil seal line 35 is made unequal so that the lubricating oil caught by the oil catching member 29 flows along the oil seal line 35 toward an opening of the oil path 28 on the side 10a opposite to the side on which the pinion is disposed by a component force generated by centrifugal force making a rotation on the input shaft 21.

The operation of the lubricating structure of the automatic transmission according to the first embodiment will be described.

An oil seal line corresponds to a line on which the O-ring 33 attached to the oil catching member 29 comes into contact with the side 10a of the carrier plate 10 which is opposite to the side on which the pinion is disposed, and the oil seal line 35 includes the substantially rectilinear portions 35a . . . by which the distance in radial directions from the input shaft 21 to each point on the oil seal line 35 is made unequal so that the lubricating oil caught by the oil catching member 29 flows along the oil seal line 35 toward the opening of the oil path 28 on the side 10a opposite to the side on which the pinion is disposed by the centrifugal force making a rotation on the input shaft 21.

In this way, since the substantially rectilinear portions 35a make the distance in radial directions from the input shaft 21 to the oil seal line 35 unequal, as shown by thick arrows in FIG. 1, the centrifugal force making a rotation on the input shaft 21 generates a component force in the direction where each of the adjacent pinion shafts 7a, 7a is disposed.

The component force causes the lubricating oil caught by the oil catching member 29 to flow in the direction where each of the pinion shafts 7a, 7a is disposed.

In this way, the lubricating oil flows along the substantially rectilinear portions 35a of the oil seal line 35 toward the opening of the oil path 28 on the side 10a opposite to the side on which the pinion is disposed, then passes through the oil path 28, and flows from an opening on the side where the pinion is disposed. Thereby, the pinion shaft 7a, the needle bearing 7b, and the pinion 7 are lubricated with the lubricating oil.

Therefore, the lubricating oil steadily flows in the direction where each of the pinion shafts 7a, 7a is disposed, so that a sufficient quantity of lubricating oil can always be supplied to the pinion 7. As a result, the efficiency of lubrication can be heightened without requiring a large quantity of lubricating oil as in the conventional structure.

Figure 4:
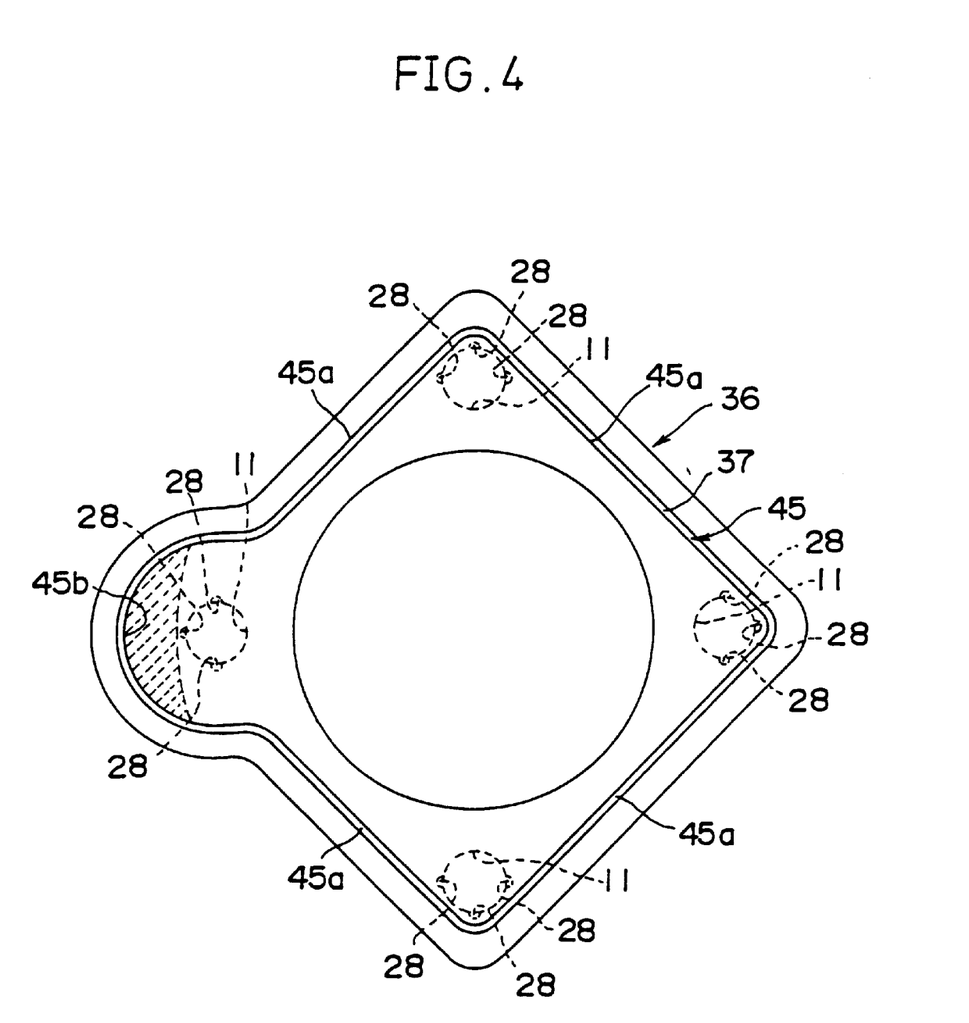
FIG. 4 is a plan view of an oil catching member in a lubricating structure of an automatic transmission according to a second embodiment, seen from a side where a carrier plate is disposed.

FIG. 4 shows a lubricating structure of an automatic transmission according to a second embodiment of the present invention. Herein, the same numerals are each given to the same constituent parts as those of the automatic transmission lubricating structure according to the first embodiment.

In the lubricating structure of the automatic transmission according to the second embodiment, each of substantially rectilinear portions 45a of the oil seal line 45 determined by the configuration of an O-ring groove 37 of an oil catching member 36 is formed along the circumscribed line of the shaft holding holes 11, 11 into which the adjacent pinion shafts 7a, 7a are inserted.

Further, the oil seal line 45 includes an unnecessary-substance puddle 45b which is swelled outside of the shaft holding hole 11 into which the adjacent pinion shaft 7a is inserted, so that the unnecessary substances do not flow out along the oil seal line 45 even under centrifugal force making a rotation on the input shaft 21.

The operation of the lubricating structure of the automatic transmission according to the second embodiment will now be described.

In the lubricating structure of the automatic transmission according to the second embodiment, each of the substantially rectilinear portions 45a of the oil seal line 45 is formed along the circumscribed line between the adjacent shaft holding holes 11, 11.

Therefore, since the distance in radial directions from the input shaft 21 to each point on the oil seal line 45 is unequal, component forces of the centrifugal force making a rotation on the input shaft 21 work on every point of the oil seal line 45.

The unnecessary-substance puddle 45b holds the unnecessary substances so that the unnecessary substances do not flow out along the oil seal line 45 in the direction of the oil paths 28 even under the centrifugal force making a rotation on the input shaft 21.

In other words, the unnecessary substances, such as initially-worn powder and the like, along with the lubricating oil, flow along each of the rectilinear portions 45a of the oil seal line 45 by the component forces of the centrifugal force, and then flow into the unnecessary-substance puddle 45b.

In the unnecessary-substance puddle 45b, the unnecessary substances having larger specific gravity than the lubricating oil are held on the bottom of the side of the oil seal line 45 by the centrifugal force making a rotation on the input shaft 21, and in addition, the separated lubricating oil flows out of the oil path 28 in the direction where the pinion 7 is disposed.

Therefore, the flow of the lubricating oil can be prevented from being blocked with the unnecessary substances, and the durability of a member to be lubricated, such as the thrust washer 27, the needle bearing 7b, or the like, can be prevented from being lowered.

Since the other constructions and operations are substantially the same as those of the first embodiment, the explanation thereof will be omitted.

Figure 5:
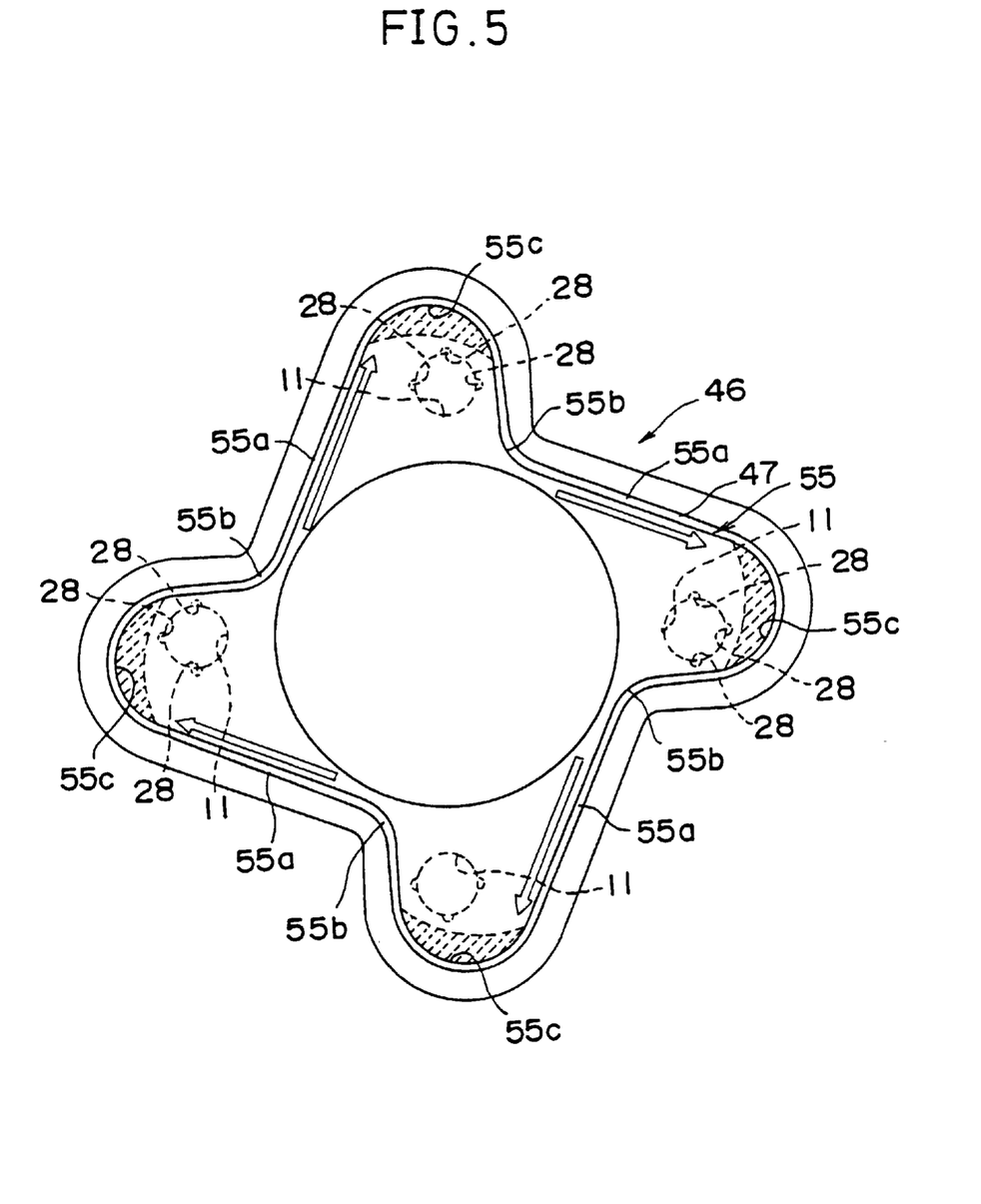
FIG. 5 is a plan view of an oil catching member in a lubricating structure of an automatic transmission according to a third embodiment, seen from a side where a carrier plate is disposed.

FIG. 5 shows a lubricating structure of an automatic transmission according to a third embodiment of the present invention. Herein, the same numerals are each given to the same constituent parts as those of the automatic transmission lubricating structures according to the first and second embodiments.

In the lubricating structure of the automatic transmission according to the third embodiment, each rectilinear portion 55a of the oil seal line 55 determined by the configuration of an O-ring groove 47 of an oil catching member 46 includes each part 55b which projects toward the input shaft 21 from the circumscribed line between the shaft holding holes 11, 11 of the adjacent pinion shafts 7a, 7a.

In the lubricating structure of the automatic transmission according to the third embodiment, each of the projecting part 55b is formed closer to one pinion shaft 7a located on the left side in FIG. 5 of the pinion shafts 7a, 7a which are adjacent to each other in the circumferential direction.

Further, the oil seal line 55 includes unnecessary-substance puddles 55c which are swelled outside of a position where each of the shaft holding hole 11 into which the pinion shaft 7a is inserted is disposed, and which hold the unnecessary substances so that the unnecessary substances do not flow out along the oil seal line 55 even under centrifugal force making a rotation on the input shaft 21.

The operation of the lubricating structure of the automatic transmission according to the third embodiment will now be described.

In the lubricating structure of the automatic transmission according to the third embodiment, the oil seal line 55 includes parts 55b which project toward the input shaft 21 from the circumscribed line between the adjacent pinion shafts 7a, 7a.

Therefore, the direction of each component force generated along each rectilinear portion 55a defines a narrower angle and thus comes closer to the radial direction where the centrifugal force works so that the component force becomes larger than that in the first and second embodiments.

Therefore, the component force working on the lubricating oil caught by the rectilinear portion 55a becomes larger, and the efficiency of lubrication can be made higher.

As shown in the third embodiment, for example, in a case where the part 55b projecting toward the input shaft 21 is formed closer to either of the adjacent pinion shafts 7a, 7a, the centrifugal force enables a component force directed toward the other pinion shaft 7a to be generated on the substantially entire oil seal line, that is, on the rectilinear portion 55a, as shown by thick arrows in FIG. 5.

Therefore, as shown in the third embodiment, in a case where the relative rotational direction of the input shaft 21 and the planet carrier 9 is kept in substantially the same direction in each transmission gear, the lubricating oil can flow more smoothly toward the other pinion shaft 7a positioned on the right side in the circumferential direction in FIG. 5.

Since the other constructions and operations are substantially the same as those of the first and second embodiments, the explanation thereof will be omitted.

Figure 6:
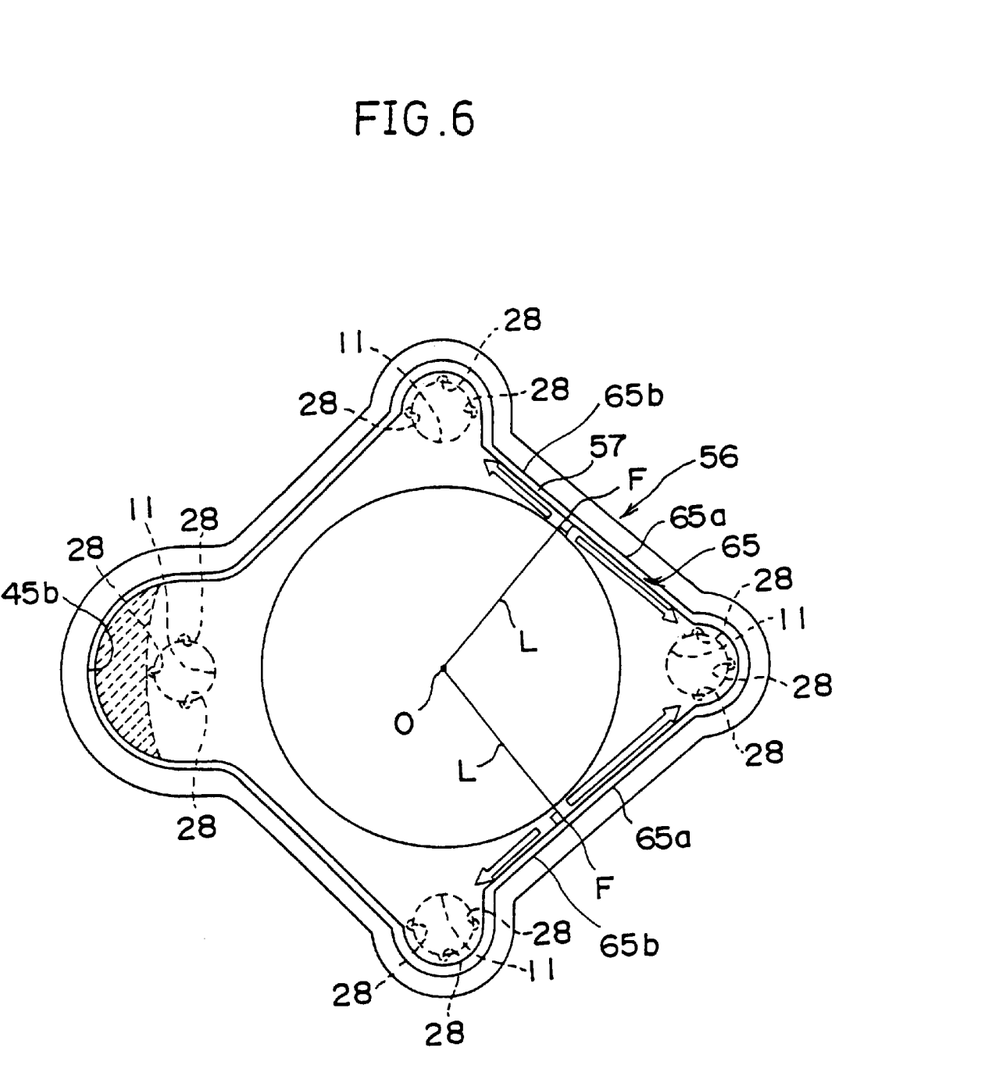
FIG. 6 is a plan view of an oil catching member in a lubricating structure of an automatic transmission according to a fourth embodiment, seen from a side where a carrier plate is disposed.

FIG. 6 shows a lubricating structure of an automatic transmission according to a fourth embodiment of the present invention. Herein, the same numerals are each given to the same constituent parts as those of the automatic transmission lubricating structures according to the first to third embodiments.

In the lubricating structure of the automatic transmission according to the fourth embodiment, rectilinear portions 65a, 65a and 65b, 65b of the oil seal line 65 determined by the configuration of an O-ring groove 57 of an oil catching member 56 are formed rectilinearly between positions which the adjacent pinion shafts 7a, 7a are disposed.

Besides, the rectilinear portion 65a is formed so that each distance between the foot F of a perpendicular on the rectilinear portion 65a divided by a perpendicular line L extending from the center O of the input shaft 21 and each pinion shaft 7a, 7a becomes unequal.

The operation of the lubricating structure of the automatic transmission according to the fourth embodiment will now be described.

In the lubricating structure of the automatic transmission according to the fourth embodiment, rectilinear portions 65a, 65a of the oil seal line 65 are formed rectilinearly between the adjacent pinion shafts 7a, 7a, and in addition, are formed to make unequal each distance between the foot F of the perpendicular on the rectilinear portion 65a divided by the perpendicular line L extending from the center O of the input shaft 21 and each pinion shaft 7a, 7a. Thereby, each component force generated on the oil seal line 65 between the foot F of the perpendicular and each position where the adjacent pinion shafts 7a, 7a are disposed, as shown by thick arrows in FIG. 6, is directed separately from the foot F of the perpendicular toward each adjacent pinion shaft 7a, 7a.

Therefore, the quantity of the lubricating oil flowing toward each pinion shaft can be regulated by being substantially proportioned to each distance from each pinion shaft 7a, 7a to the foot F of the perpendicular, and even in the case where a pinion has unequal pitches depending upon the number of its teeth, for example, the desirable quantity of lubricating oil can be transmitted to each pinion shaft.

Since the other constructions and operations are substantially the same as those of the first to third embodiments, the explanation thereof will be omitted.

Figure 7:
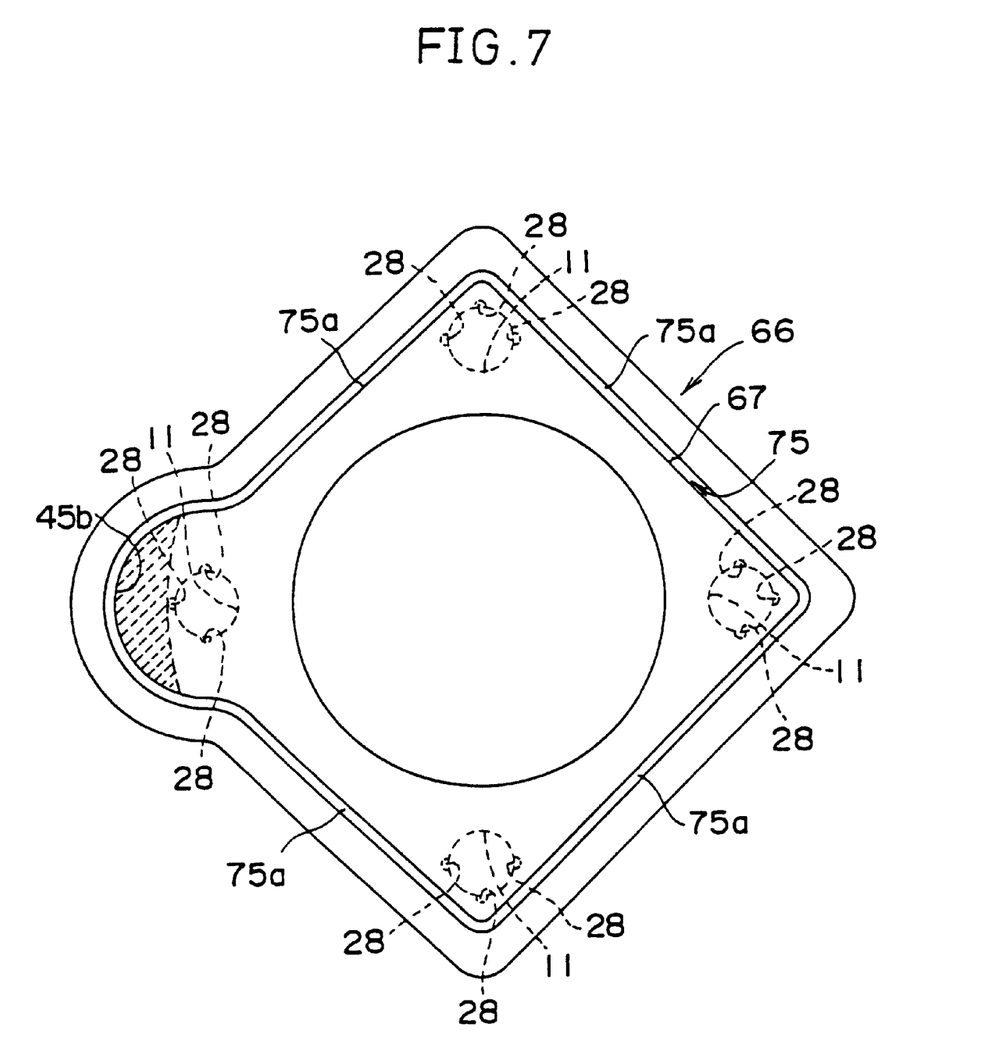
FIG. 7 is a plan view of an oil catching member in a lubricating structure of an automatic transmission according to a fifth embodiment, seen from a side where a carrier plate is disposed.

FIG. 7 shows a lubricating structure of an automatic transmission according to a fifth embodiment of the present invention. Herein, the same numerals are each given to the same constituent parts as those of the automatic transmission lubricating structure according to the first embodiment.

In the lubricating structure of the automatic transmission according to the fifth embodiment, substantially rectilinear portions 75a of the oil seal line 75 determined by the configuration of an O-ring groove 67 of an oil catching member 66 are formed along the circumscribed line of the shaft holding holes 11, 11 into which the adjacent pinion shafts 7a, 7a are inserted, and in addition, are formed outside of and parallel with the circumscribed line.

Since the other constructions and operations are substantially the same as those of the first embodiment, the explanation thereof will be omitted.

Figure 8:
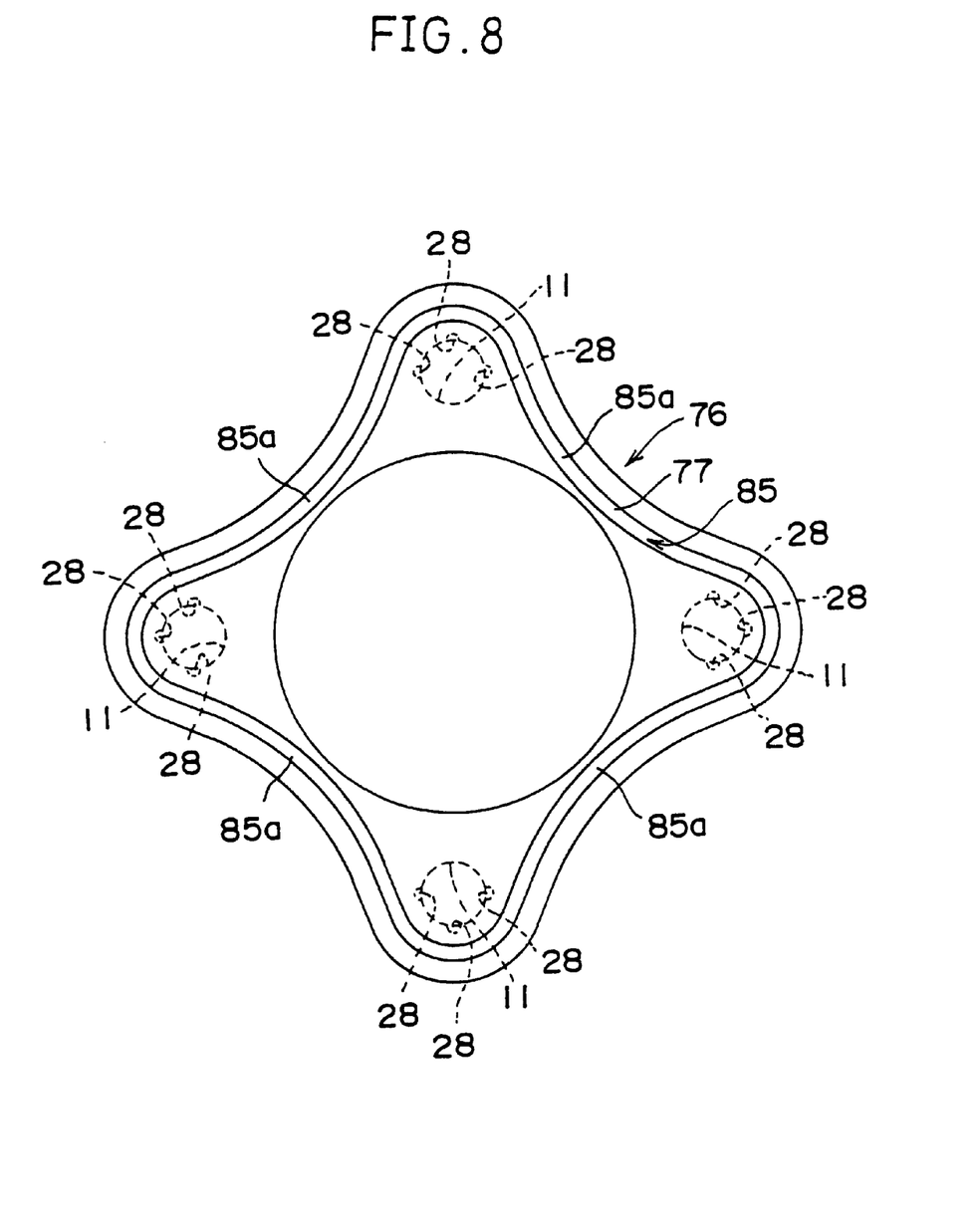
FIG. 8 is a plan view of an oil catching member in a lubricating structure of an automatic transmission according to a sixth embodiment, seen from a side where a carrier plate is disposed.

FIG. 8 shows a lubricating structure of an automatic transmission according to a sixth embodiment of the present invention. Herein, the same numerals are each given to the same constituent parts as those of the automatic transmission lubricating structure according to the first embodiment.

In the lubricating structure of the automatic transmission according to the sixth embodiment, parts of the oil seal line 85 determined by the configuration of an O-ring groove 77 of an oil catching member 76 between the shaft holding holes 11, 11 into which the adjacent pinion shafts 7a, 7a are inserted include curved-line portions 85a which project toward the input shaft 21.

The operation of the lubricating structure of the automatic transmission according to the sixth embodiment will now be described.

In the lubricating structure of the automatic transmission according to the sixth embodiment, in addition to the operation according to the first embodiment, each part of the oil seal line 85 between the shaft holding holes 11, 11 includes each curved-line portion 85a which projects toward the input shaft 21. Thereby, the lubricating oil flows smoothly along the curved-line portions 85a toward the pinion shafts 7a, 7a by the component forces of the centrifugal force, and then is led into the oil holes 28.

Since the other constructions and operations are substantially the same as those of the first embodiment, the explanation thereof will be omitted.

The details of the first to sixth embodiments of the present invention was described with reference to the attached drawings. However, the present invention is not limited to these embodiments. The present invention may be embodied in other modifications without departing from the spirit or essential characteristics of the present invention.

In the first to sixth embodiments, for example, the oil holes 28 are formed in the shaft holding hole 11 holding the pinion shaft 7a. However, the present invention is not limited to this. For example, the configuration or the number of oil holes is not limited, as long as they are formed, as shown in the conventional example, in the axial direction of the pinion shaft 7a in substantially the center thereof, in other words, as long as they are formed along a direction where the axis of a pinion shaft extends so as to connect both sides of carrier plates.

Further, in the first to sixth embodiments, the four sets of pinions 7 and pinion shafts 7a are used. However, the present invention is not limited to this construction. For example, a planetary gear device including one set to three sets, or five or more sets of pinions 7 and pinion shafts 7a may be used. In respect of the form, a double pinion form may be used instead of the single pinion form.

Further, in the first to sixth embodiments, a planetary gear device including the input shaft 21 used as the rotational-center axis has been described. However, the present invention is not limited to this. For example, a planetary gear device including an output shaft or the like as the rotational-center axis may be used.

Further, in the first to sixth embodiments, the rubber O-ring 33 is used as a seal member which comes into contact with the carrier plate 10 and with which the oil seal line 35 and the like are formed. However, the present invention is not limited to this. For example, as shown in the conventional example, a seal member, such as the platelike seal member 15 disposed between the carrier plate 10 and the oil catching member 14, may be used. In this case, an oil seal line corresponds to the inner circumferential line of the seal member 15.

Further, in the aforementioned embodiments, the attachment portion 32 of the oil catching member 29 is fixed by being caulked by the carrier plate 10. However, the present invention is not limited to this. For example, the oil catching member 29 and the like may also be fixed on the carrier plate 10 in spot welding or any other operation.

As mentioned above, according to the present invention, an oil seal line corresponds to a line on which the oil catching member comes into contact with the carrier plate, and the oil seal line has a configuration in which the distance in radial directions from the rotational-center axis to each point on the oil seal line is made unequal so that the lubricating oil caught by the oil catching member flows along the oil seal line toward an opening of the oil path on the side opposite to the side on which the pinion is disposed by centrifugal force making rotation on the rotational-center axis.

According to this construction, since the distance in radial directions from the rotational-center axis to each point on the oil seal line is unequal, the centrifugal force making a rotation on the rotational-center axis generates a component force in the direction where each of the adjacent pinion shafts is disposed. This component force carries the lubricating oil caught by the oil catching member in the direction where each of the pinion shafts is disposed.

The lubricating oil flows along the oil seal line toward the opening of the oil path on the side opposite to the side on which the pinion is disposed, then passes through the oil path, then flows from an opening on the side where the pinion is disposed, and thereby the pinion is lubricated with the lubricating oil.

Therefore, the flow of the lubricating oil in the direction where each of the pinion shafts is disposed occurs without a break, so that a sufficient quantity of lubricating oil can always be supplied to the pinion. As a result, the efficiency of lubrication can be heightened without a large quantity of lubricating oil required conventionally.

Further, the oil seal line is formed along the circumscribed line between the adjacent pinion shafts.

Therefore, since the distance in radial directions from the rotational-center axis to each point on the oil seal line is unequal, the component force of the centrifugal force making a rotation on the rotational-center axis works along the oil seal line, i.e., at any point on the oil seal line.

Further, the oil seal line includes a part projecting toward the side of the rotational-center axis from the circumscribed line between the adjacent pinion shafts, so that the component force can be made larger.

For example, in a case where the projecting part toward the side of the rotational-center axis is formed close to either side of the pinion shafts, the centrifugal force can generate a component force directed to the other pinion shaft substantially over the whole oil seal line.

Therefore, in a case where the relative rotational direction of the rotational-center axis and the carrier is kept in substantially the same direction in each transmission gear, the lubricating oil can flow more smoothly to the other pinion shaft.

Further, the oil seal line is formed rectilinearly between the adjacent pinion shafts, and in addition, it is formed so that each distance between the foot of the perpendicular on the straight oil seal line divided by the perpendicular line extending from the rotational-center axis and each pinion shaft becomes unequal. Therefore, the component force generated on the oil seal line between the foot of the perpendicular and each pinion shaft is directed to each pinion shaft.

Therefore, the quantity of the lubricating oil flowing toward each pinion shaft can be regulated by being substantially proportioned to each distance from the pinion shaft to the foot of the perpendicular.

Further, the unnecessary-substance puddle holds the unnecessary substances so that the unnecessary substances do not flow out along the oil seal line even under the centrifugal force making a rotation on the rotational-center axis.

Therefore, there can be fulfilled the practically useful advantage that the flow of the lubricating oil is prevented from being blocked with the unnecessary substances, such as initially-worn powder, and that the durability of a member to be lubricated, such as a bearing member, is prevented from being lowered.

What is claimed is:

1. A lubricating structure of an automatic transmission comprising:

a sun gear disposed along a rotational-center axis;

a plurality of pinions disposed around said sun gear for engaging with said sun gear;

a plurality of pinion shafts holding said pinions, respectively, so that said pinions can rotate freely;

a carrier which includes two carrier plates holding each end of said pinion shafts;

a plurality of oil paths, each of them being formed through one of said two carrier plates or said pinion shafts in an axial direction of said pinion shafts; and an oil catching member disposed circularly around the rotational-center axis on a surface of said one of said two carrier plates, the surface being opposite to a surface of the one on which said pinions are disposed, said oil catching member catching lubricating oil supplied from the rotational-center axis and leading the lubricating oil to said oil paths;

wherein an oil seal line defined by contact of said oil catching member with said one of said two carrier plates includes rectilinear portions between the pinion shafts adjacent to each other and one or more projecting portions enclosing said pinion shafts so that the lubricating oil caught by said oil catching member is caused to flow toward respective openings of said oil paths on the side opposite to the side on which said pinions are disposed by centrifugal force generated by rotation of the automatic transmission about the rotational-center axis.

2. A lubricating structure of an automatic transmission according to claim 1, wherein said oil seal line is formed along a circumscribed line between the pinion shafts which are adjacent to each other.

3. A lubricating structure of an automatic transmission according to claim 1, wherein said oil seal line includes a part projecting toward the rotational-center axis from a circumscribed line between the pinion shafts which are adjacent to each other.

4. A lubricating structure of an automatic transmission according to claim 1, wherein said oil seal line is formed to make unequal each distance between each pinion shaft and a toe of a perpendicular extending from the rotational-center axis to said oil seal line.

5. A lubricating structure of an automatic transmission according to claim 4, wherein said oil seal line includes an unnecessary-substance pooling portion swelling outside said pinion shafts, for holding unnecessary substances so that the unnecessary substances do not flow out along the oil seal line even under the centrifugal force generating rotation on the rotational-center axis.

* * * * *